Dec. 22, 1942.    J. G. HENRY    2,305,706
FORK
Filed April 8, 1942    2 Sheets-Sheet 1
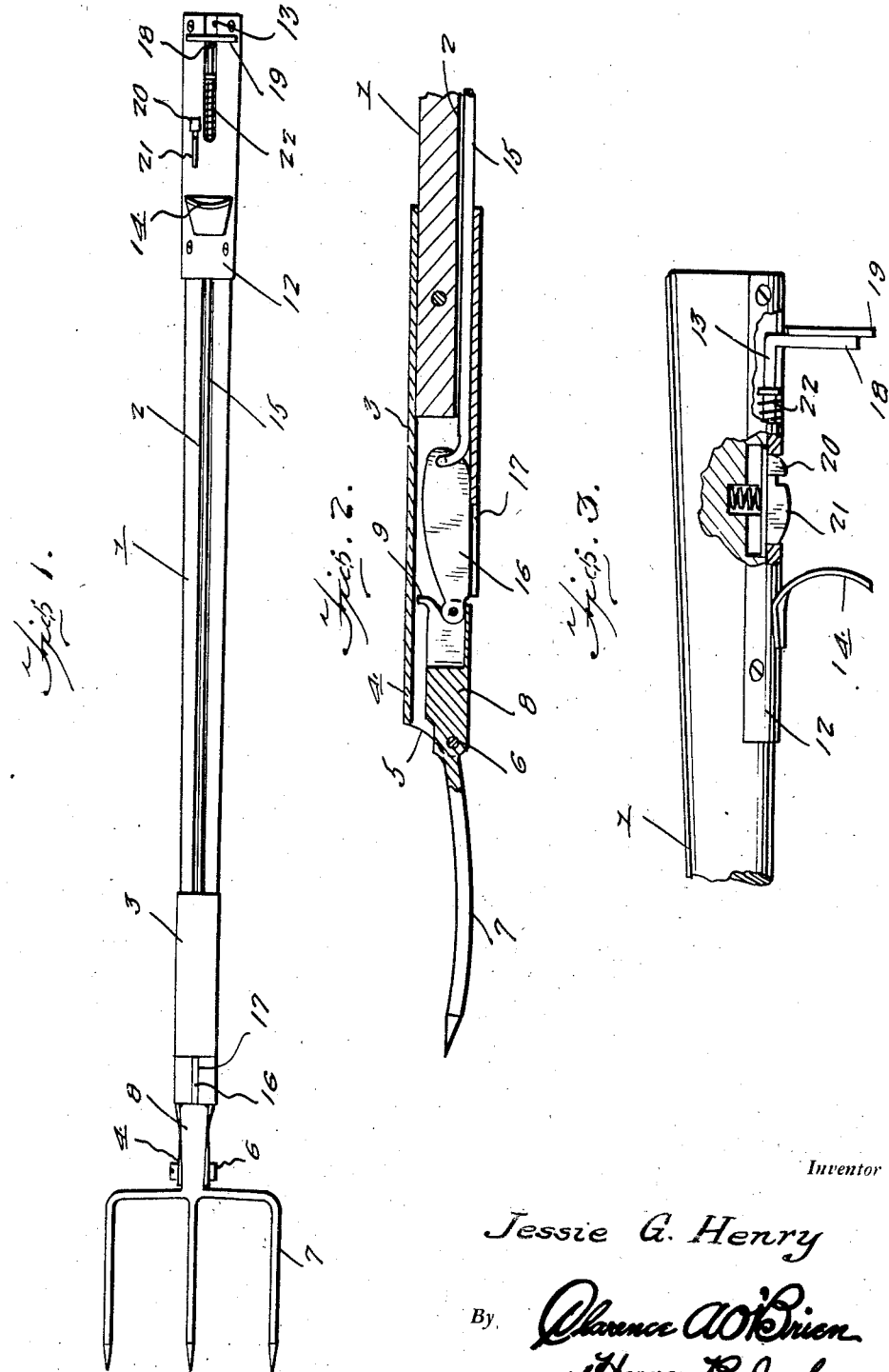
Inventor
Jessie G. Henry Dec. 22, 1942.    J. G. HENRY    2,305,706
FORK
Filed April 8, 1942    2 Sheets-Sheet 2
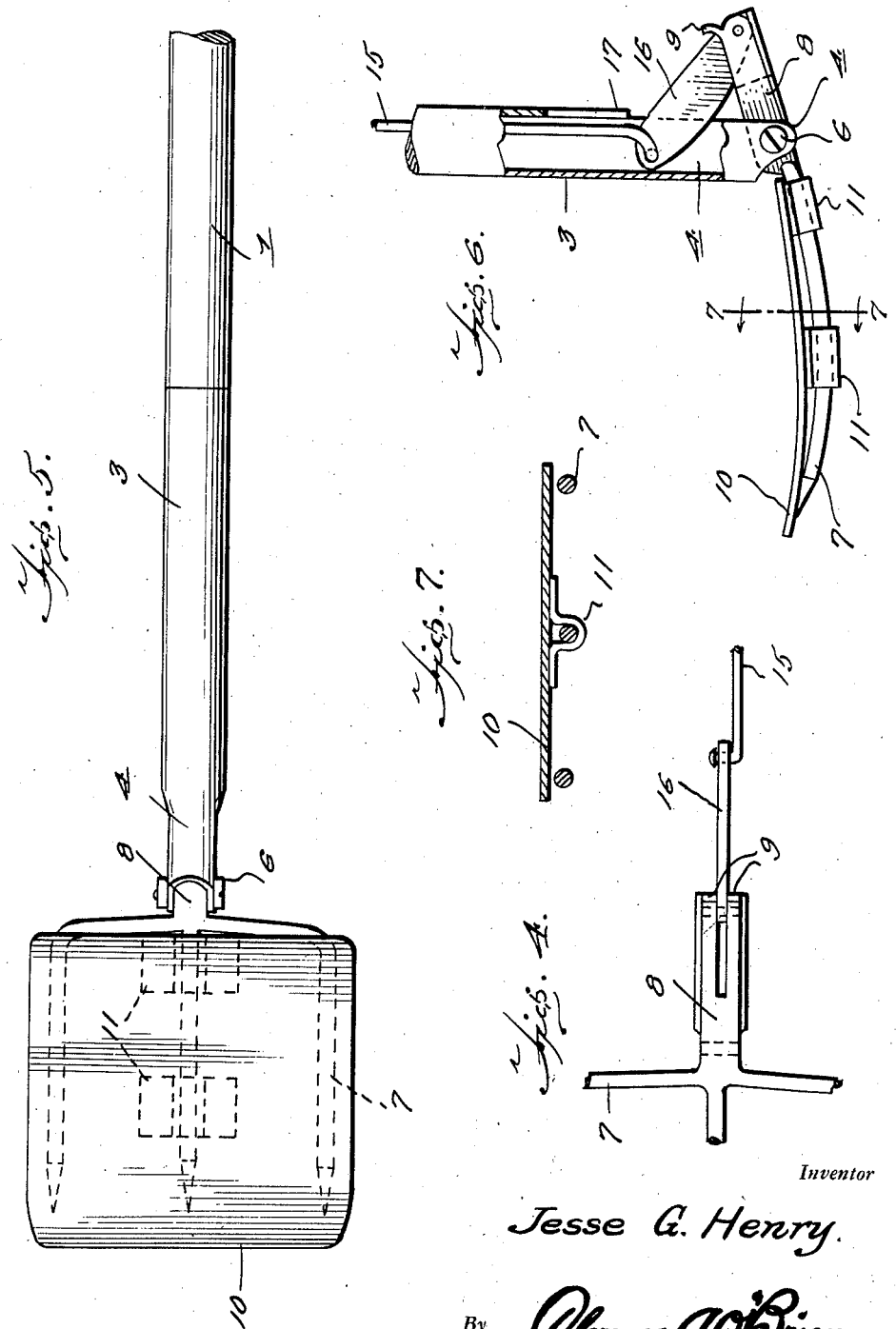
Inventor
Jesse G. Henry.
By Clarence A. O'Brien
and Harvey B. Jackson
Attorneys Patented Dec. 22, 1942

2,305,706

UNITED STATES PATENT OFFICE 2,305,706

FORK

Jesse G. Henry, Lewistown, Pa.

Application April 8, 1942, Serial No. 438,167

3 Claims. (Cl. 30—122)

The present invention relates to new and useful improvements in forks, and has for one of its important objects to provide, in a manner as hereinafter set forth, a device of this character comprising a novel construction and arrangement for facilitating the removal, for example, of foods from utensils in which they are cooked and transferring said foods to plates or other receptacles.

Another very important object of the invention is to provide, in an implement of the aforementioned character comprising a handle and a fork pivotally mounted thereon, novel means for actuating said fork and for releasably securing same in the desired position.

Other objects of the invention are to provide a fork of the character described which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a bottom plan view of a fork constructed in accordance with the present invention.

Figure 2 is a view in vertical longitudinal section through the forward portion of the device.

Figure 3 is a view in side elevation of the rear end portion of the device, a portion thereof being broken away in section to expose the latch.

Figure 4 is a top plan view of the portion of the operating mechanism which is connected to the pivoted fork.

Figure 5 is a top plan view of the forward portion of the device with the removable plate in position on the fork.

Figure 6 is a view in side elevation, partially in section, of the forward portion of the device, showing the fork with the plate thereon in folded position.

Figure 7 is a cross-sectional view, taken substantially on the line 7—7 of Figure 6.

Referring now to the drawings in detail, it will be seen that the embodiment of the invention which has been illustrated comprises an elongated handle 1 of suitable length and diameter, which handle may be of any desired material. The handle 1 has formed therein a longitudinal groove 2.

Secured on the forward end portion of the handle 1 and projecting forwardly therefrom is a ferrule 3. The ferrule 3 includes a forward end portion 4 of substantially U-shaped cross-section which terminates, at its forward end, in apertured bifurcations or ears 5.

Pivotally mounted on a suitable pin or the like 6 between the bifurcations 5 is a fork 7. The substantially U-shaped end portion 4 of the ferrule 3 accommodates an arm 8 on the pivoted end of the fork 7. Stops 9 on the free end of the arm 8 are engageable with the ferrule 3 for positively limiting the swinging movement of the fork 7 toward open position.

Removably mounted on the tines of the fork 7 is an arcuate plate 10 of suitable metal. The removable plate 10 has fixed on its lower side metallic loops 11 which slidably receive the intermediate tine of the fork 7. This is illustrated to advantage in Figures 6 and 7 of the drawings.

Fixed beneath the rear end portion of the handle 1 is a metallic plate 12 of arcuate cross-section. The plate 12 has formed in its rear end portion a longitudinal slot 13, the purpose of which will be presently set forth. Depending from the forward portion of the plate 12 is a finger piece or grip 14.

A rod 15 is operable in the groove 2 of the handle 1. At its forward end, the rod 15 is operatively connected to the arm 8 for actuating the fork 7 on its pivot 6 through the medium of a link 16. The forward end portion of the ferrule 3 has formed, in its lower portion, a longitudinal slot 17 which accommodates the link 16, as best seen in Figure 6 of the drawings.

The rod 15 terminates in a right angularly extending rear end portion 18 which is operable in the slot 13 in the plate 12. Fixed on this end portion 18 of the rod 15 is a plate 19. Mounted in the rear end portion of the handle 1 is a spring pressed latch 20. The latch 20 is operable in an opening which is provided therefor in the plate 12 for engagement with the plate 19 for releasably securing the rod 15 in its forward or projected position. The latch 20 includes a thumb piece 21 for disengaging said latch from the plate 19 when it is desired to release the rod 15. A coil spring 22 returns the rod 15 to retracted position when said rod is released by the latch 20.

It is thought that the manner of using the device will be readily apparent from a consideration of the foregoing. Briefly, when the rod 15 is in its retracted position, the fork 7 extends substantially longitudinally from handle 1. With the plate 10 in position on the fork 7, the device is adapted for use as a spoon, spade or the like.

When it is desired to swing the fork 7 to a position substantially at right angles to the handle 1, a thumb is engaged with the plate 19 and the rod 15 is moved forwardly against the tension of the coil spring 22. Thus, through the medium of the link 16, the arm 8 is caused to swing out of the substantially U-shaped portion 4 of the barrel 3. The spring pressed latch 20 engages the plate 19 for releasably securing the fork 7 in this position.

It is believed that the many advantages of a fork constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A device of the character described comprising an elongated handle, a fork pivotally mounted on one end portion of said handle, an elongated plate, of arcuate cross-section, mounted on the other end portion of the handle, said plate having a longitudinal slot therein, a longitudinal rod slidably mounted on the handle, said rod including an angularly extending end portion operable in the slot, a thumb piece on said angularly extending end portion of the rod for actuating said rod in one direction, means operatively connecting the fork to the rod for swinging said fork to a position at an angle relative to the handle, a spring pressed latch mounted in the handle, said latch being engageable with said rod actuating thumb piece for releasably securing the fork in position at an angle to the handle, and a coil spring operatively connected to the rod for returning the fork to its first position.

2. A fork comprising an elongated handle, a ferrule on one end portion of said handle projecting longitudinally therefrom, said ferrule including a forward portion of substantially U-shaped cross-section terminating in forwardly projecting bifurcations, a fork pivotally mounted between said bifurcations, an arm fixed on the pivoted end of said fork, a rod slidable longitudinally on the handle, a link operatively connecting said rod to the arm for swinging the fork relative to the handle, the ferrule having a longitudinal slot therein accommodating said link, and means for actuating the rod.

3. A device of the character described comprising an elongated handle having a longitudinal groove therein, a ferrule on one end portion of the handle projecting longitudinally therefrom, a fork pivotally mounted on the ferrule for swinging movement relative to the handle, a rod slidable in the groove and extending into said ferrule, a link operatively connecting the fork to the rod for actuation thereby, a plate of arcuate cross-section on the other end portion of the handle, said plate having a longitudinal slot therein, the rod including an angularly extending end portion operable in the slot, a thumb piece on said end portion for manually projecting the rod, a spring pressed latch in the handle engageable with said thumb piece for releasably securing the rod in projected position, and a coil spring in the handle operatively connected to the rod for retracting said rod.

JESSE G. HENRY.